(12) United States Patent
Register et al.

(10) Patent No.: US 11,396,173 B2
(45) Date of Patent: Jul. 26, 2022

(54) TOOL AND ASSOCIATED METHOD FOR MANUFACTURING THE SAME

(71) Applicant: The Boeing Company, Chicago, IL (US)

(72) Inventors: Justin H. Register, Charleston, SC (US); Remmelt Andrew Staal, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 16/276,832

(22) Filed: Feb. 15, 2019

(65) Prior Publication Data

US 2020/0262160 A1 Aug. 20, 2020

(51) Int. Cl.
*B32B 37/10* (2006.01)
*B29C 70/44* (2006.01)
*B29C 65/00* (2006.01)
*B29C 70/30* (2006.01)
*B29C 70/54* (2006.01)
*B29L 31/28* (2006.01)
*B29L 31/30* (2006.01)

(52) U.S. Cl.
CPC .... *B32B 37/1018* (2013.01); *B29C 66/81455* (2013.01); *B29C 70/30* (2013.01); *B29C 70/44* (2013.01); *B29C 70/546* (2013.01); *B29L 2031/28* (2013.01); *B29L 2031/3076* (2013.01)

(58) Field of Classification Search
None
See application file for complete search history.

(56) References Cited

U.S. PATENT DOCUMENTS

| 5,071,338 | A | * | 12/1991 | Dublinski | B29C 43/3642 425/403 |
| 5,242,523 | A | | 9/1993 | Willden et al. | |
| 6,206,067 | B1 | * | 3/2001 | Kociemba | B29C 43/3642 156/285 |
| 8,940,213 | B2 | | 1/2015 | Lockett et al. | |
| 9,114,586 | B2 | | 8/2015 | Bremmer et al. | |
| 9,623,620 | B2 | | 4/2017 | Brizon et al. | |
| 9,682,514 | B2 | | 6/2017 | Lockett et al. | |
| 2005/0023728 | A1 | * | 2/2005 | Benson | B29C 70/388 264/258 |
| 2006/0027308 | A1 | | 2/2006 | MacKenzie | |
| 2008/0110575 | A1 | | 5/2008 | Graham | |
| 2014/0116610 | A1 | * | 5/2014 | Thomas | B29D 7/00 156/250 |
| 2020/0001971 | A1 | * | 1/2020 | Douglas | B29C 70/86 |

* cited by examiner

*Primary Examiner* — Christopher T Schatz
(74) *Attorney, Agent, or Firm* — Walters & Wasylyna LLC

(57) ABSTRACT

A method for manufacturing a tool including assembling a stack-up that includes a plurality of precured composite laminates, the stack-up having an engagement surface, wherein each precured composite laminate of the plurality of precured composite laminates is flexible, and wherein an adhesive is positioned between adjacent precured composite laminates of the plurality of precured composite laminates, and placing the engagement surface of the stack-up onto a target surface of a substrate.

26 Claims, 7 Drawing Sheets

TOOL AND ASSOCIATED METHOD FOR MANUFACTURING THE SAME

FIELD

This application relates to composite structures and, more particularly, to the manufacture of tools, such as cure/consolidation tools (e.g., cauls and mandrels) useful in the repair of composite structures.

BACKGROUND

Fiber-reinforced plastics, such as epoxy-based carbon fiber-reinforced composites, have high strength-to-weight ratios and excellent durability, among other desirable properties. Therefore, composite structures formed from fiber-reinforced plastics are now widely used in the aerospace industry (e.g., as structural components of aircraft), as well in various other industries. While fiber-reinforced plastics have many advantages, the repair of composite structures formed from fiber-reinforced plastics can be time-consuming and, therefore, expensive.

For example, when damage (e.g., delamination or a crack) is discovered in a composite structure formed from fiber-reinforced thermoset or thermoplastic plastic, the repair process typically includes multiple steps. The composite structure is sanded down (or otherwise processed) to remove the damage. The removed material is replaced with new plies of composite material, such as plies of pre-impregnated reinforcing material (pre-preg), thereby building up the damage site to the required geometry. The new plies of composite material are then covered with a cure/consolidation tool, and cured (thermoset) or consolidated (thermoplastic), as appropriate.

Since composite structures typically have unique contoured surfaces, the cure/consolidation tool must have a surface contour that closely corresponds to the contoured surface of the composite structure being repaired. However, manufacturing cure/consolidation tools with precise surface contours is time-consuming and, thus, significantly contributes to the overall cost of repairing composite structures.

Accordingly, those skilled in the art continue with research and development efforts in the field of composite structure repair.

SUMMARY

One aspect of the disclosed tool includes a tool body defining an engagement surface, wherein the tool body includes a plurality of precured composite laminates, wherein each precured composite laminate of the plurality of precured composite laminates includes at least two plies of fiber-reinforced plastic, and wherein each precured composite laminate of the plurality of precured composite laminates has been bonded with adhesive to adjacent precured composite laminates of the plurality of precured composite laminates.

One aspect of the disclosed method for manufacturing a tool includes steps of assembling a stack-up including a plurality of precured composite laminates, the stack-up having an engagement surface, wherein each precured composite laminate of the plurality of precured composite laminates is flexible, and wherein an adhesive is positioned between adjacent precured composite laminates of the plurality of precured composite laminates, and placing the engagement surface of the stack-up onto a target surface of a substrate.

Other aspects of the disclosed tool and associated method for manufacturing the same will become apparent from the following detailed description, the accompanying drawings and the appended claims.

DETAILED DESCRIPTION

Figure 1:
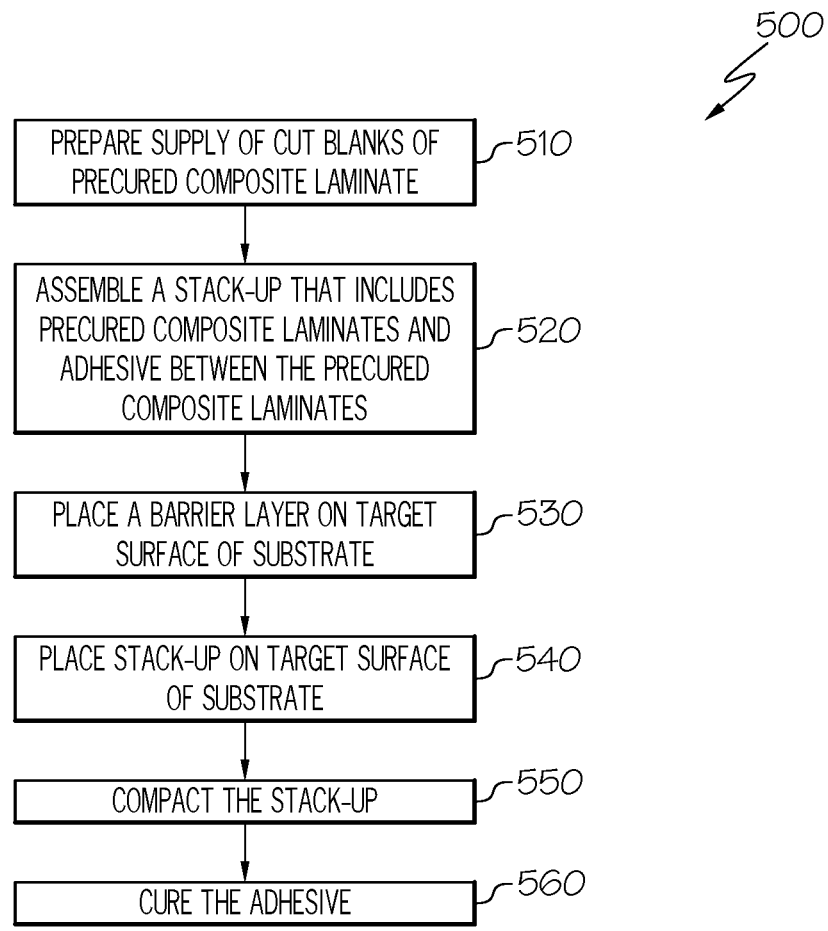
FIG. 1 is a flow diagram of an aspect of the disclosed method for manufacturing a tool.
Figure 7:
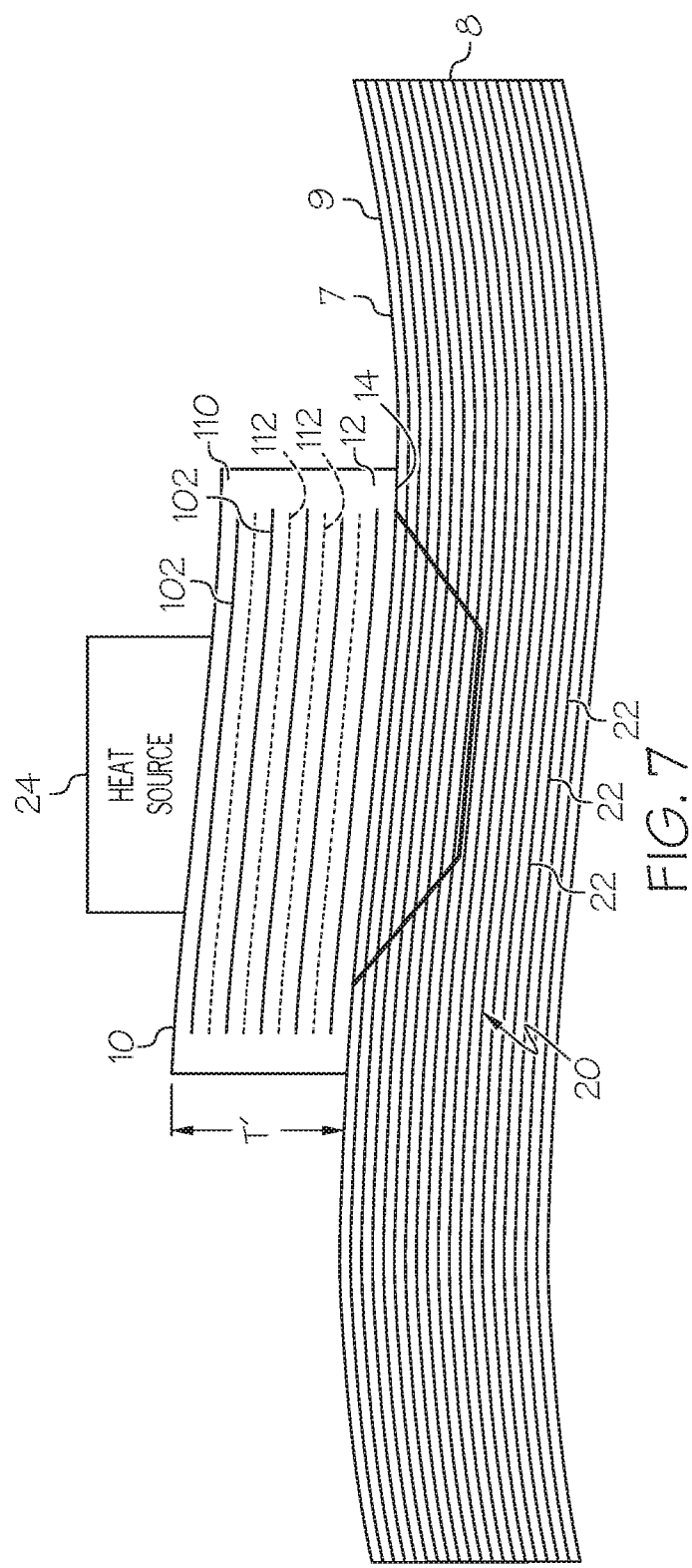
FIG. 7 is a schematic side elevational view, in cross-section, of the tool manufactured in accordance with the method depicted in FIG. 1, wherein the tool is shown in connection with the repair of a composite structure.

Referring to FIG. 1, disclosed is a method, generally designated 500, for manufacturing a tool 10 (FIG. 7). Upon reading the present disclosure, those skilled in the art will appreciate that the disclosed method 500 may be used to manufacture a wide variety of tools 10. For example, the disclosed method 500 may be used to manufacture cure/consolidation tools, such as cauls and mandrels, which may then be used in the repair or rework of composite structures.

Figure 2:
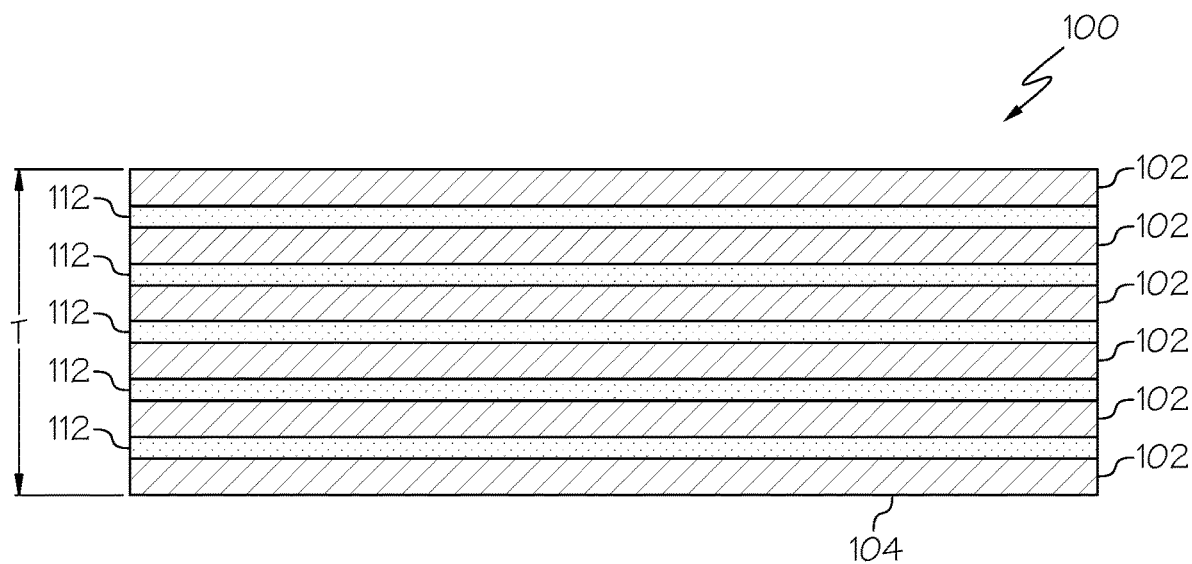
FIG. 2 is a schematic side elevational view, in cross-section, of the stack-up assembled in accordance with the method depicted in FIG. 1.

As shown at Block 520 of FIG. 1 and with reference to FIG. 2, the method 500 includes the step of assembling a stack-up 100 having an engagement surface 104. The stack-up 100 includes a plurality of precured composite laminates 102. The stack-up 100 further includes adhesive 112 positioned between adjacent precured composite laminates 102.

The number of precured composite laminates 102 in the stack-up 100 may be a design variable, which may require consideration of the size of the tool 10 (FIG. 7) being manufactured, desired stiffness of the tool 10, and composition of the precured composite laminates 102 and/or the adhesive 112, among other possible factors. In one expression, the stack-up 100 may include at least three precured composite laminates 102. In another expression, the stack-up 100 may include at least five precured composite laminates 102. In another expression, the stack-up 100 may include at least ten precured composite laminates 102. In yet another expression, the stack-up 100 has a predefined cross-sectional thickness T (FIG. 2), and the quantity of precured composite laminates 102 in the stack-up 100 is a function of the predefined cross-sectional thickness T of the stack-up 100.

Figure 3:
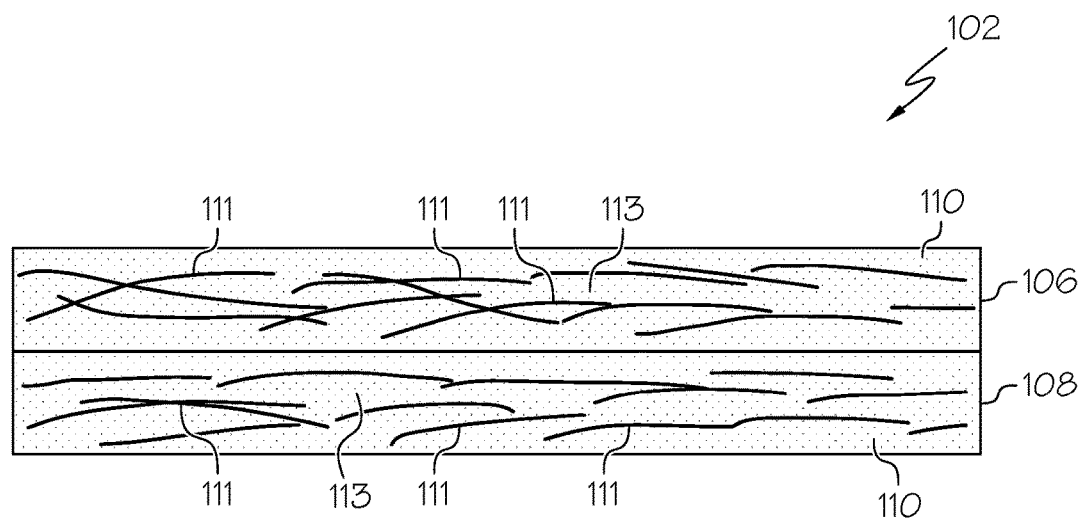
FIG. 3 is a schematic side elevational view, in cross-section, of a precured composite laminate of the stack-up of FIG. 2.

Referring to FIG. 3, each precured composite laminate 102 of the stack-up 100 (FIG. 2) includes at least two plies 106, 108 of fiber-reinforced plastic 110 that have been precured together to form the precured composite laminate 102. However, there may be a maximum number of plies 106, 108 per precured composite laminate 102 to ensure that each precured composite laminate 102 has a certain degree of stiffness, yet remains flexible. In one expression, each precured composite laminate 102 of the stack-up 100 may include at least two, but at most twenty, plies 106, 108 of fiber-reinforced plastic 110. In another expression, each precured composite laminate 102 of the stack-up 100 may include at least two, but at most fifteen, plies 106, 108 of fiber-reinforced plastic 110. In another expression, each precured composite laminate 102 of the stack-up 100 may include at least two, but at most ten, plies 106, 108 of fiber-reinforced plastic 110. In another expression, each precured composite laminate 102 of the stack-up 100 may include at least two, but at most seven, plies 106, 108 of fiber-reinforced plastic 110. In yet another expression, each precured composite laminate 102 of the stack-up 100 may include at least two, but at most five, plies 106, 108 of fiber-reinforced plastic 110.

Compositionally, the fiber-reinforced plastic 110 of each ply 106, 108 of a precured composite laminate 102 may include reinforcing fibers 111 embedded in a matrix material 113. The reinforcing fibers 111 may be (or may include) carbon fibers, glass fibers or the like.

The plies 106, 108 of a precured composite laminate 102 may be oriented in various ways with respect to other plies 106, 108 in the precured composite laminate 102, without departing from the scope of the present disclosure. As one example, each precured composite laminate 102 may include two plies 106, 108, wherein the reinforcing fibers 111 of one ply 106 of the precured composite laminate 102 are oriented a non-zero angle (e.g., 90 degrees) relative to the reinforcing fibers 111 of the other ply 108 of the precured composite laminate 102. As another example, each precured composite laminate 102 may include two plies 106, 108, wherein the reinforcing fibers 111 of both plies 106, 108 are oriented in the same direction.

Likewise, the precured composite laminates 102 in the stack-up 100 may be oriented in various ways with respect to other precured composite laminates 102 in the stack-up 100, without departing from the scope of the present disclosure. As one example, each precured composite laminate 102 in the stack-up 100 may be oriented in the same direction. As another example, each precured composite laminate 102 in the stack-up 100 may be oriented at a non-zero angle (e.g., 90 degrees) relative to the immediately subjacent precured composite laminate 102 in the stack-up 100.

The matrix material 113 of the fiber-reinforced plastic 110 may be (or may include) a thermoset resin, such as, for example, an epoxy resin or the like, and combinations of thermoset resins. It is also contemplated that the matrix material 113 of the fiber-reinforced plastic 110 may be (or may include) a thermoplastic resin, such as, for example, polyetheretherketone ("PEEK"), polyetherketoneketone ("PEKK"), polyphenylsulfone ("PPS"), polyetherimide ("PEI") or the like, and combinations of thermoplastic resins.

Referring back to FIG. 2, the adhesive 112 is positioned between adjacent precured composite laminates 102 of the stack-up 100 such that the adhesive 112 can bond together the precured composite laminates 102 of the stack-up 100. The adhesive 112 may initially be uncured, and may require subsequent curing, as is described herein.

Various adhesives 112 may be used to assemble the stack-up 100 without departing from the scope of the present disclosure. In one particular implementation, the adhesive 112 may be (or may include) a thermosetting adhesive, such as an epoxy adhesive. The adhesive 112 may come in the form of a film (a film adhesive), though other forms, such as liquid, powder or the like, may be used without departing from the scope of the present disclosure. As one specific, non-limiting example, the adhesive 112 may be LOCTITE EA 9696 060NW AERO modified epoxy film adhesive, which is commercially available from Henkel AG & Company, KGaA of Dusseldorf, Germany.

Selection of an appropriate adhesive 112 may also include consideration of the end-use of the tool 10 (FIG. 7) being manufactured by the disclosed method 500. When the tool 10 being manufactured is a cure/consolidation tool, the maximum service temperature of the adhesive 112 should also be considered. For example, the adhesive 112 may be selected to have a maximum service temperature of at least about 250° F. One non-limiting example of such an adhesive 112 is LOCTITE EA 9696 060NW AERO modified epoxy film adhesive.

Figure 4:
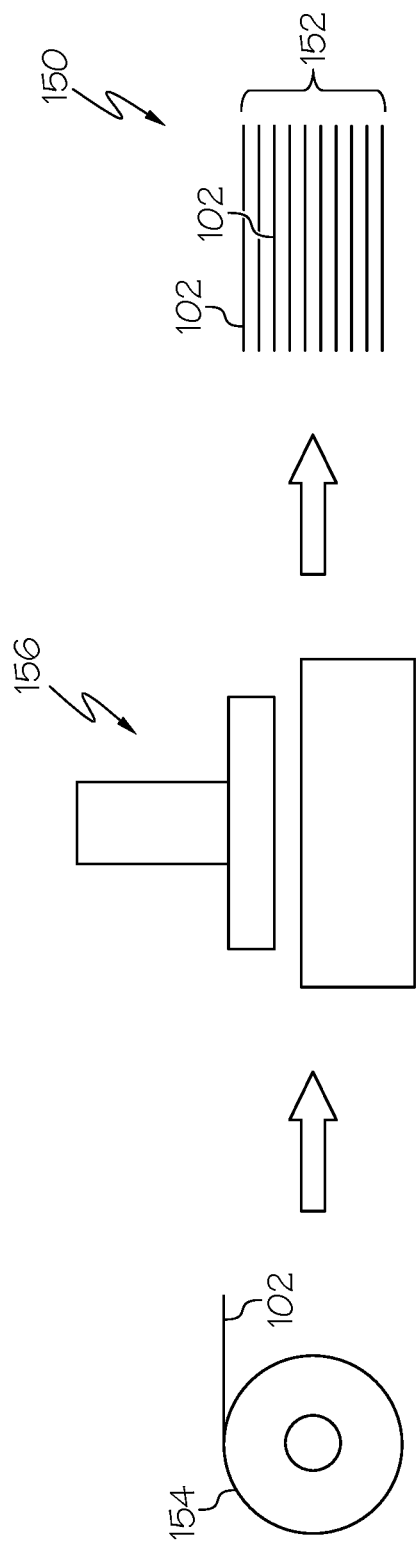
FIG. 4 is a schematic process flow diagram depicting the preparation of a supply of cut blanks of precured composite laminate in accordance with the method depicted in FIG. 1.

As shown at Block 510 of FIG. 1 and with reference to FIG. 4, the method 500 may further include the step of preparing a supply 150 of cut blanks 152 of precured composite laminate 102. The step (Block 510) of preparing the supply 150 of cut blanks 152 of precured composite laminate 102 may occur prior to the step (Block 520) of assembling the stack-up 100. Therefore, the step (Block 520) of assembling the stack-up 100 may include sourcing the precured composite laminates 102 from the supply 150 of the cut blanks 152 of precured composite laminate 102.

The step (Block 510) of preparing the supply 150 of cut blanks 152 of precured composite laminate 102 may include the step of cutting the cut blanks 152 from a bulk feed 154 of precured composite laminate 102. For example, the step of cutting the cut blanks 152 from a bulk feed 154 of precured composite laminate 102 may include die cutting the bulk feed 154 of precured composite laminate 102 at a die cutting station 156.

Figure 5:
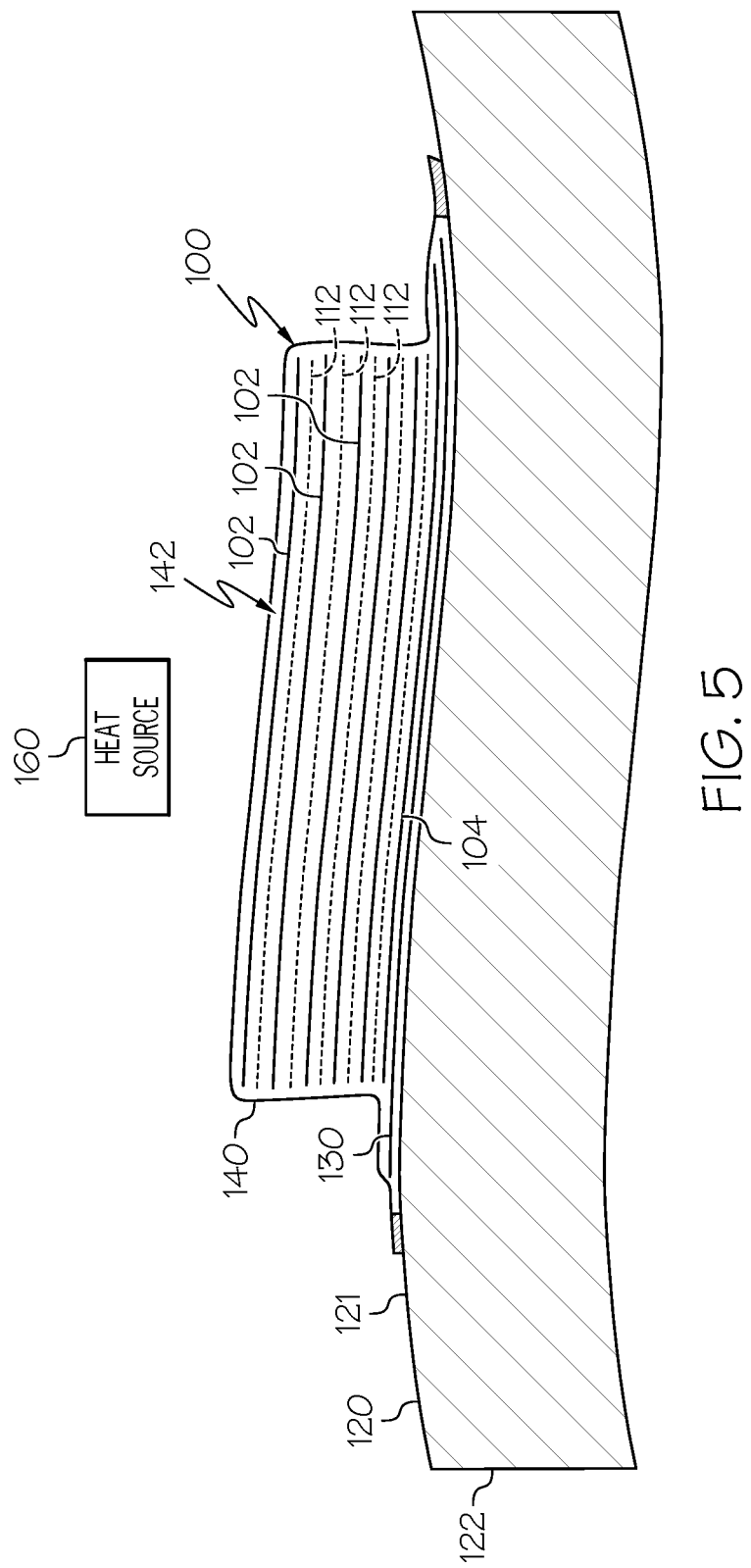
FIG. 5 is a schematic side elevational view, in cross-section, of the stack-up of FIG. 2 placed onto a target surface of a substrate in accordance with the method depicted in FIG. 1.

As shown at Block 540 of FIG. 1 and with reference to FIG. 5, the method 500 further includes the step of placing the stack-up 100 onto a target surface 120 of a substrate 122. The stack-up 100 may be placed onto the target surface 120 of the substrate 122 such that the engagement surface 104 of the stack-up 100 assumes a contour 121 of the target surface 120 of the substrate 122.

The substrate 122 may be representative of a composite structure 8 (FIG. 7) in need of repair or rework. As one example, when the composite structure 8 (FIG. 7) in need of repair or rework is an airframe 1018 (FIG. 9) of an aircraft 1002, the substrate 122 may be the airframe of a different aircraft of the same make/model. As another example, when the composite structure 8 (FIG. 7) in need of repair or rework is a portion of an airframe 1018 (FIG. 9) of an aircraft 1002, the substrate 122 may be a different (e.g., adjacent) portion of the airframe 1018.

Figure 6:
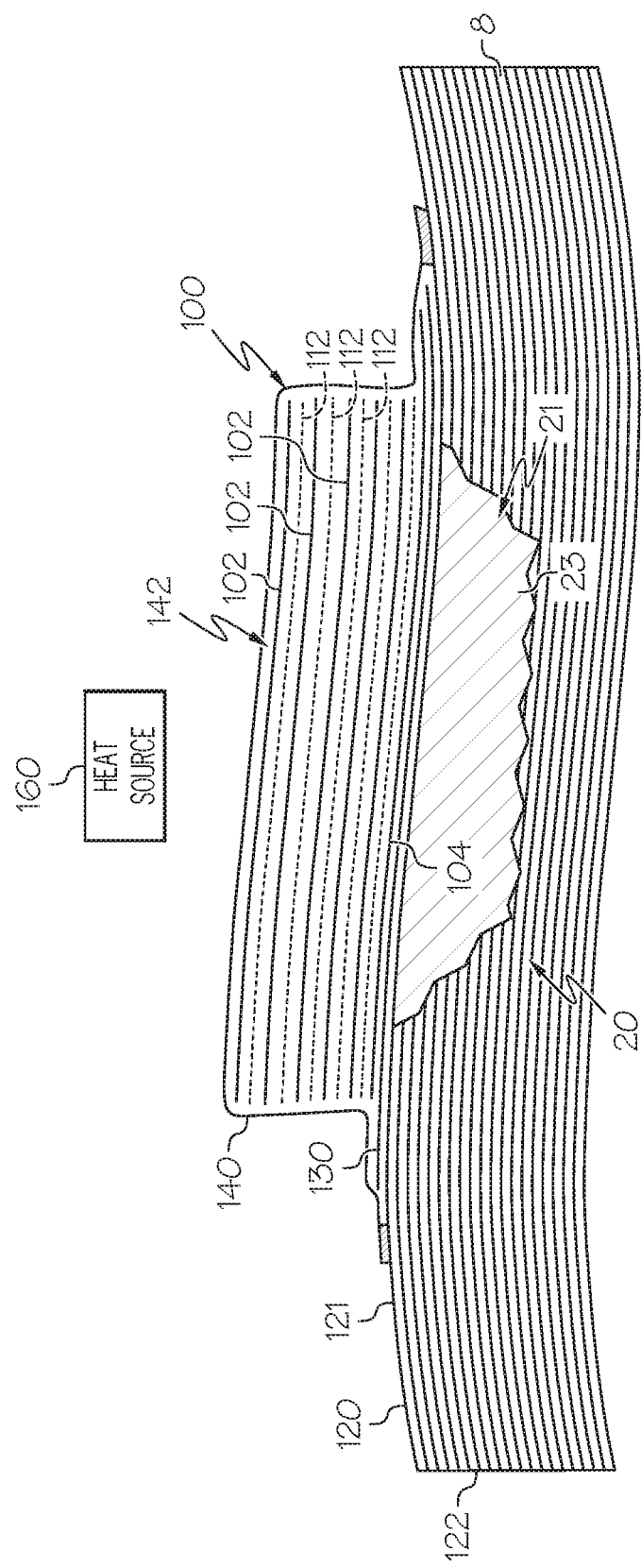
FIG. 6 is a schematic side elevational view, in cross-section, of the stack-up of FIG. 2 placed onto another type of target surface.

Alternatively, as shown in FIG. 6, it is also contemplated that the substrate 122 may be a composite structure 8 in need of repair or rework, and for which a tool 10 (FIG. 7) is being manufactured by the disclosed method 500. If the stack-up 100 is assembled on a composite structure 8 in need of repair or rework, then any gap 21 where the repair/rework is needed may be temporarily filled with a filler material 23 (e.g., putty) to temporarily restore the target surface 120 of the substrate 122 to the correct shape/contour. For example, the substrate 122 may include a damage site 20 and the filler material 23 may be introduced to the damage site 20 such that the filler material 23 forms at least a portion of the target surface 120 of the substrate 122.

To this point, the step (Block 540) of placing the stack-up 100 onto the substrate 122 has been shown and described as independent of the step (Block 520) of assembling the stack-up 100. However, those skilled in the art will appreciate that the step (Block 520) of assembling the stack-up 100 may be performed simultaneously with the step (Block 540) of placing the stack-up 100 onto the substrate 122. In other words, the stack-up 100 may be assembled directly on the substrate 122, rather than being assembled elsewhere (e.g., on a workbench) and then transferred and placed onto the substrate 122.

As shown at Block 530 of FIG. 1 and with reference to FIG. 5, the method 500 may further include the step of placing a barrier layer 130 between the target surface 120 of the substrate 122 and the engagement surface 104 of the stack-up 100. The step (Block 530) of placing the barrier layer 130 may occur prior to the step (Block 540) of placing the stack-up 100 onto the substrate 122. Therefore, the barrier layer 130 may inhibit direct contact between the substrate 122 and the adhesive 112 in the stack-up 100.

Various materials may be used as the barrier layer 130 without departing from the scope of the present disclosure. In one particular implementation, the barrier layer 130 may be (or may include) a film, such as a fluoropolymer film. For example, the barrier layer 130 may be a Teflon™ FEP fluorinated ethylene propylene resin film, which is commercially available from The Chemours Company of Wilmington, Del.

As shown at Block 550 of FIG. 1, the method 500 may further include the step of compacting the stack-up 100 onto the target surface 120 of the substrate 122. The step (Block 550) of compacting the stack-up 100 may ensure that the engagement surface 104 of the stack-up 100 assumes the contour 121 of the target surface 120 of the substrate 122. The step (Block 550) of compacting the stack-up 100 may also compact together the layers of the stack-up 100 and reduce/eliminate any air within the stack-up 100.

In one particular implementation, the step (Block 550) of compacting the stack-up 100 may include connecting a vacuum bag 140 to the substrate 122 to define a vacuum chamber 142 is such a manner that the stack-up 100 is received within the vacuum chamber 142. The vacuum chamber 142 may be defined by the substrate 122 and the vacuum bag 140. Then, a vacuum may be drawn within the vacuum chamber 142 (e.g., by fluidly coupling a vacuum pump with the vacuum chamber 142).

As shown at Block 560 of FIG. 1, the method 500 may further include the step of curing the adhesive 112 while the stack-up 100 is on the target surface 120 of the substrate 122. At this point, those skilled in the art will appreciate that the step (Block 560) of curing the adhesive 112 between the precured composite laminates 102 may set the shape of the stack-up 100, thereby yielding a tool 10 (FIG. 7), such as a cure/consolidation tool.

The step (Block 560) of curing the adhesive 112 may include heating the stack-up 100 to a cure temperature, which may be dictated by the composition of the adhesive 112. For example, a heat source 160 (e.g., a heat blanket) may be placed near (e.g., over) the stack-up 100 to facilitate curing of the adhesive 112. The step (Block 560) of curing the adhesive 112 may further include maintaining the stack-up 100 at the cure temperature for a minimum amount of time (e.g., at least 15 seconds). The use of other curing techniques (e.g., application of ultraviolet light) is also contemplated, whether as an alternative to heating or in addition to heating. Those skilled in the art will appreciate that selection of an appropriate curing technique may require consideration of the composition of the adhesive 112.

Referring to FIG. 7, the disclosed tool 10 includes a tool body 12 defining an engagement surface 14. The tool body 12 includes precured composite laminates 102 that have been bonded together with adhesive 112. Each precured composite laminate 102 of the tool body 12 includes at least two plies of fiber-reinforced plastic 110.

The number of precured composite laminates 102 in the tool body 12 may be a design variable, which may require consideration of the size of the tool 10 being manufactured, desired stiffness of the tool 10, and composition of the precured composite laminates 102 and/or the adhesive 112, among other possible factors. In one expression, the tool body 12 may include at least three precured composite laminates 102. In another expression, the tool body 12 may include at least five precured composite laminates 102. In another expression, the tool body 12 may include at least ten precured composite laminates 102. In yet another expression, the tool body 12 has a predefined cross-sectional thickness T', and the quantity of precured composite laminates 102 in the tool body 12 is a function of the predefined cross-sectional thickness T' of the tool body 12.

As shown in FIG. 3, each precured composite laminate 102 in the tool body 12 (FIG. 7) includes at least two plies 106, 108 of fiber-reinforced plastic 110 that have been precured together to form the precured composite laminate 102. In one expression, each precured composite laminate 102 may include at least two, but at most twenty, plies 106, 108 of fiber-reinforced plastic 110. In another expression, each precured composite laminate 102 may include at least two, but at most fifteen, plies 106, 108 of fiber-reinforced plastic 110. In another expression, each precured composite laminate 102 may include at least two, but at most ten, plies 106, 108 of fiber-reinforced plastic 110. In another expression, each precured composite laminate 102 may include at least two, but at most seven, plies 106, 108 of fiber-reinforced plastic 110. In yet another expression, each precured composite laminate 102 may include at least two, but at most five, plies 106, 108 of fiber-reinforced plastic 110.

Compositionally, the fiber-reinforced plastic 110 of each ply 106, 108 of a precured composite laminate 102 may include reinforcing fibers 111 embedded in a matrix material 113. The reinforcing fibers 111 may be (or may include) carbon fibers, glass fibers or the like. The matrix material 113 of the fiber-reinforced plastic 110 may be (or may include) a thermoset resin, such as, for example, an epoxy resin or the like, and combinations of thermoset resins. It is also contemplated that the matrix material 113 of the fiber-reinforced plastic 110 may be (or may include) a thermoplastic resin, such as, for example, polyetheretherketone ("PEEK"), polyetherketoneketone ("PEKK"), polyphenylsulfone ("PPS"), polyetherimide ("PEI") or the like, and combinations of thermoplastic resins.

At this point, those skilled in the art will appreciate that the precured composite laminates 102 in the stack-up 100 are sufficiently flexible to facilitate the stack-up 100 assuming the contour 121 of the target surface 120 on which the stack-up 100 is applied. Then, the precured composite laminates 102 in the stack-up 100 are locked into place by curing the adhesive 112. Prior to curing the adhesive 112, the precured composite laminates 102 can slip or shear relative to each other. Curing the adhesive 112 acts to prevent the precured composite laminates 102 from slipping or shearing relative to each other, thus making the stack-up 100 rigid enough for tooling.

Referring back to FIG. 7, the adhesive 112 is positioned between adjacent precured composite laminates 102 of the tool body 12 such that the adhesive 112 bonds together the precured composite laminates 102 of the tool body 12.

Various adhesives 112 may be used in the tool body 12 without departing from the scope of the present disclosure. In one particular implementation, the adhesive 112 may be (or may include) a thermosetting adhesive, such as an epoxy adhesive. As one specific, non-limiting example, the adhesive 112 may be LOCTITE EA 9696 060NW AERO modified epoxy film adhesive.

Selection of an appropriate adhesive 112 may also include consideration of the end-use of the tool 10. When the tool 10 being manufactured is a cure/consolidation tool, the maximum service temperature of the adhesive 112 should also be considered. For example, the adhesive 112 may be selected to have a maximum service temperature of at least about 250° F. One non-limiting example of such an adhesive 112 is LOCTITE EA 9696 060NW AERO modified epoxy film adhesive.

As shown in FIG. 7, the tool 10 may be used to repair or rework a composite structure 8. The composite structure 8 may have a damage site 20, which may previously have contained damage, such as a crack or delamination, but which damage has since been removed (e.g., by sanding or cutting). The damage site 20 of the composite structure 8 may be filled with new plies 22 of composite material, such as plies of pre-impregnated reinforcing material (pre-preg). The new plies 22 of composite material may build up the damage site 20 to the required geometry or greater than the required geometry (such that the required geometry is obtained after cure/consolidation). Then, the engagement surface 14 of the tool 10 may be placed into contact (e.g., direct contact) with the new plies 22 at the damage site 20. The engagement surface 14 of the tool 10 may be sized to not only cover the damage site 20, but also to extend outside of the damage site 20 and contact the surface 9 of the composite structure 8 surrounding the damage site 20. Finally, the new plies 22 within the damage site 20 may be cured (or, alternatively, consolidate), such as by applying heat (e.g., by way of a heat source 24 (e.g., a heat blanket). Once cured, the tool 10 may be removed from the composite structure 8.

Accordingly, disclosed is a fast and efficient method for manufacturing a tool 10 having an engagement surface 14 that closely matches the contour 7 of the surface 9 of a composite structure 8.

Figure 8:
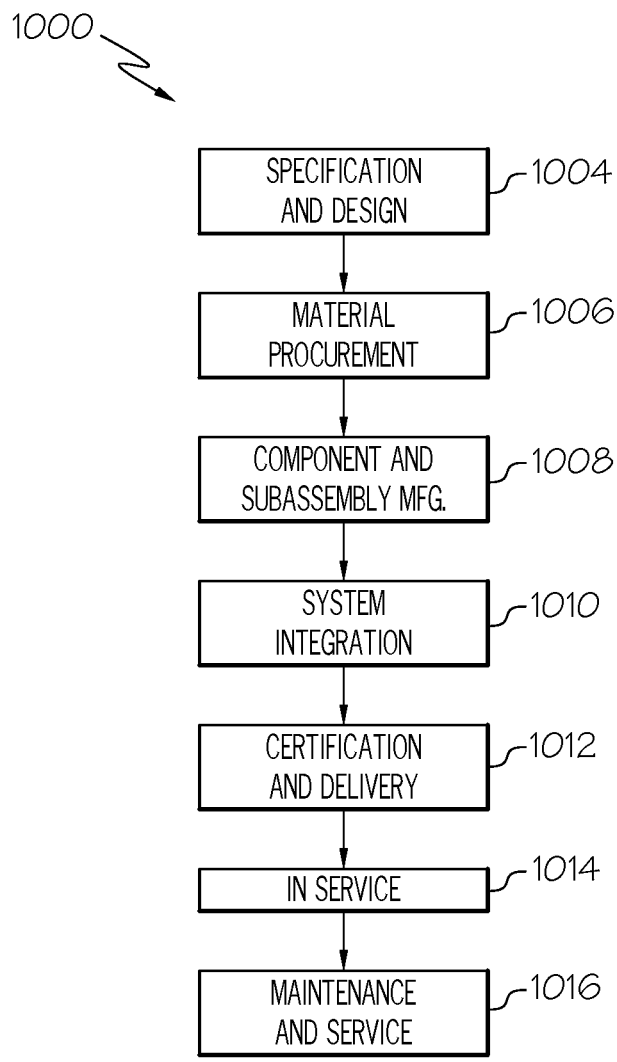
FIG. 8 is a flow diagram of an aircraft manufacturing and service methodology.
Figure 9:
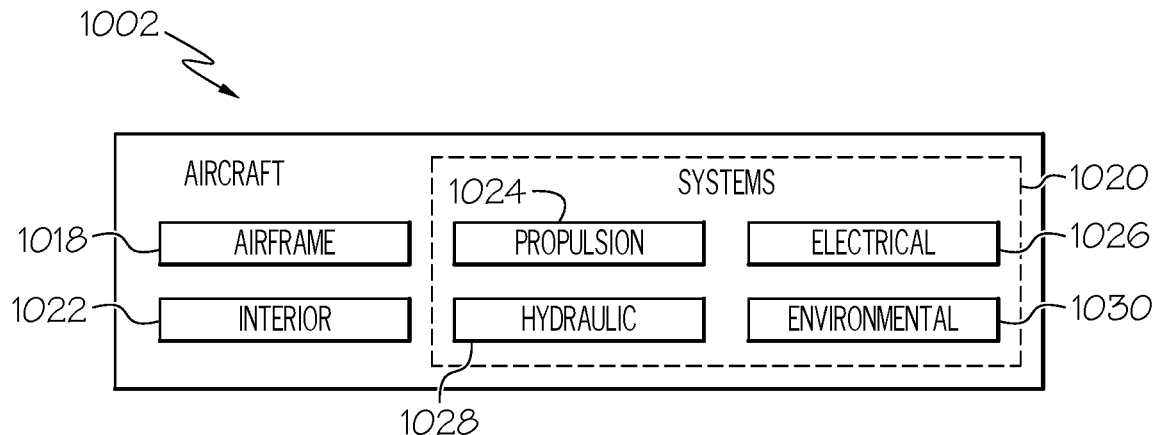
FIG. 9 is a block diagram of an aircraft.

Examples of the disclosure may be described in the context of an aircraft manufacturing and service method 1000, as shown in FIG. 8, and an aircraft 1002, as shown in FIG. 9. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed tool 10 (FIG. 7) and associated method 500 (FIG. 1) for manufacturing the same may be used during any one or more of the stages of the aircraft manufacturing and service method 1000. As one example, components or subassemblies corresponding to component/subassembly manufacturing 1008, system integration 1010, and or maintenance and service 1016 may be fabricated or manufactured using the disclosed tool 10 and associated method 500 for manufacturing the same. As another example, the airframe 1018 may be constructed using the disclosed tool 10 and associated method 500 for manufacturing the same. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed tool 10 (FIG. 7) and associated method 500 (FIG. 1) for manufacturing the same are described in the context of an aircraft; however, one of ordinary skill in the art will readily recognize that the disclosed tool 10 and associated method 500 for manufacturing the same may be utilized for a variety of applications. For example, the disclosed tool 10 and associated method 500 for manufacturing the same may be implemented in diverse types of vehicles including, for example, helicopters, passenger ships, automobiles, marine products (boat, motors, etc.) and the like.

Although various aspects of the disclosed tool and associated method for manufacturing the same have been shown and described, modifications may occur to those skilled in the art upon reading the specification. The present application includes such modifications and is limited only by the scope of the claims.

What is claimed is:

1. A method for manufacturing a tool, the method comprising:
   providing a plurality of precured composite laminates, each precured composite laminate comprising at least two plies of fiber-reinforced plastic that have been precured together to form the precured composite laminate, wherein each ply of the at least two plies of fiber-reinforced plastic includes reinforcing fibers embedded in a matrix material, and wherein each precured composite laminate is flexible;
   providing an adhesive;
   assembling a stack-up comprising stacking the plurality of flexible precured composite laminates and positioning the adhesive between adjacent flexible precured composite laminates of the stacked plurality of flexible precured composite laminates, the stack-up having an engagement surface, wherein the engagement surface of the stack-up is placed onto a target surface of a substrate, the target surface having a non-planar contour;

compacting the stack-up onto the target surface of the substrate such that the engagement surface of the stack-up assumes the non-planar contour of the target surface of the substrate; and curing the adhesive while the stack-up is on the target surface of the substrate and while the stack-up is assuming the non-planar contour of the target surface of the substrate.

2. The method of claim 1 wherein the plurality of flexible precured composite laminates comprises at least five flexible precured composite laminates.

3. The method of claim 1 wherein each flexible precured composite laminate of the plurality of flexible precured composite laminates comprises at most twenty plies of fiber-reinforced plastic.

4. The method of claim 1 wherein each flexible precured composite laminate of the plurality of flexible precured composite laminates comprises at most ten plies.

5. The method of claim 1 wherein at least one of the plies of fiber-reinforced plastic is oriented at a non-zero angle relative to another one of the plies of fiber-reinforced plastic.

6. The method of claim 1 wherein the matrix of the fiber-reinforced plastic comprises a thermoset resin.

7. The method of claim 1 wherein the reinforcing fibers of the fiber-reinforced plastic comprises at least one of carbon fibers and glass fibers.

8. The method of claim 1 wherein at least one flexible precured composite laminate of the plurality of flexible precured composite laminates is oriented at a non-zero angle relative to another flexible precured composite laminate of the plurality of flexible precured composite laminates.

9. The method of claim 1 wherein the step of providing an adhesive comprises providing a thermosetting adhesive.

10. The method of claim 1 wherein the step of providing an adhesive comprises providing a film adhesive.

11. The method of claim 1 wherein the step of providing an adhesive comprises providing an epoxy film adhesive.

12. The method of claim 1 wherein the adhesive has a maximum service temperature of at least about 250° F.

13. The method of claim 1 further comprising placing a barrier layer between the target surface of the substrate and the engagement surface of the stack-up.

14. The method of claim 1 wherein the step of compacting comprises:

connecting a vacuum bag to the substrate to define a vacuum chamber, wherein the stack-up is received in the vacuum chamber.

15. The method of claim 14 wherein the step of compacting further comprises:

drawing a vacuum in the vacuum chamber.

16. The method of claim 1 wherein the step of providing a plurality of precured composite laminates comprises preparing a supply of cut blanks of precured composite laminate, wherein the assembling the stack-up comprises sourcing the plurality of precured composite laminates from the supply of the cut blanks of precured composite laminate.

17. The method of claim 16 wherein the preparing the supply of the cut blanks of precured composite laminate comprises:

cutting the cut blanks from a bulk feed of precured composite laminate.

18. The method of claim 1 wherein said substrate comprises a damage site, and the method further comprises:

introducing a filler material to the damage site, wherein the filler material temporarily forms at least a portion of the target surface upon which the engagement surface of the stack-up is placed.

19. The method of claim 1 wherein the adhesive is an uncured adhesive.

20. The method of claim 1 wherein the engagement surface of the stack-up is placed onto the target surface of a substrate during the assembly of the stack-up.

21. The method of claim 1 wherein the engagement surface of the stack-up is placed onto the target surface of a substrate before the assembly of the stack-up.

22. A method for repairing a composite structure, comprising:

manufacturing a tool according to the method of claim 1;

positioning new plies of composite material at a damaged site of the substrate; and placing the engagement surface of the tool on the damage site.

23. The method of claim 22 further comprising:

curing the new plies of composite material; and removing the tool from the cured new plies of composite material.

24. The method of claim 22 wherein the new plies of composite material are plies of pre-impregnated reinforcing material.

25. The method of claim 22, wherein the new plies of composite material are positioned to cover the damaged site of the substrate.

26. The method of claim 22, wherein the new plies of composite material are positioned to cover outside of the damaged site of the substrate.

* * * * *